United States Patent
Shmidt et al.

(10) Patent No.: US 12,508,545 B2
(45) Date of Patent: Dec. 30, 2025

(54) LIQUID PURIFICATION SYSTEM

(71) Applicant: Electrophor Inc., Woodmere, NY (US)

(72) Inventors: Joseph Lvovich Shmidt, Woodmere, NY (US); Sergej Victorovich Smirnov, St. Petersburg (RU); Vadim Nikolaevich Knizel, St. Petersburg (RU)

(73) Assignee: ELECTROPHOR INC., Woodmere, NY (US)

( * ) Notice: Subject to any disclaimer, the term of this patent is extended or adjusted under 35 U.S.C. 154(b) by 0 days.

(21) Appl. No.: 15/498,022

(22) Filed: Apr. 26, 2017

(65) Prior Publication Data

US 2017/0291142 A1    Oct. 12, 2017

Related U.S. Application Data

(63) Continuation-in-part of application No. PCT/RU2015/000522, filed on Aug. 18, 2015.

(30) Foreign Application Priority Data

Oct. 27, 2014    (RU) ............................ RU2014143176

(51) Int. Cl.
*B01D 61/08*    (2006.01)
*B01D 61/02*    (2006.01)
(Continued)

(52) U.S. Cl.
CPC ............ *B01D 61/08* (2013.01); *B01D 61/025* (2013.01); *B01D 61/12* (2013.01); *C02F 1/006* (2013.01);
(Continued)

(58) Field of Classification Search
CPC ...... B01D 61/025; B01D 61/12; B01D 61/10; B01D 61/08; C02F 1/003; C02F 1/006;
(Continued)

(56) References Cited

U.S. PATENT DOCUMENTS 2,910,836 A    11/1959    Karrer
3,493,496 A *    2/1970    Bray ..................... B01D 61/08
                                                                137/206
(Continued)

FOREIGN PATENT DOCUMENTS

CN    101732901    6/2010
CN    107108267    8/2017
(Continued)

OTHER PUBLICATIONS

Machine Translaton from the European patent office website of the description of RU 22434 U1. (Year: 2002).*

(Continued)

*Primary Examiner* — Terry K Cecil

(74) *Attorney, Agent, or Firm* — Fitch, Even, Tabin & Flannery LLP

(57) ABSTRACT

The liquid purification system comprises a source liquid supply, a purified liquid feed line to a consumer, a liquid purification unit including a liquid-liquid type container consisting of a body containing a storage cavity for purified liquid and a displacement cavity, at least one liquid purification unit, a drainage line and a liquid flow control system including a source liquid feed section and a purified liquid feed section. The liquid flow control system is configured with a source liquid distribution section arranged for maintaining liquid pressure in the displacement cavity intended mainly for source liquid. The system provides the purified liquid feed to the consumer at any stage of the liquid purification process and after the latter is completed.

13 Claims, 7 Drawing Sheets

(51) Int. Cl.

| | | |
|---|---|---|
| *B01D 61/12* | (2006.01) | |
| *C02F 1/00* | (2023.01) | |
| *C02F 1/28* | (2023.01) | |
| *C02F 1/42* | (2023.01) | |
| *C02F 1/44* | (2023.01) | |
| *C02F 1/68* | (2023.01) | |

(52) U.S. Cl.
  CPC .............. *C02F 1/008* (2013.01); *C02F 1/441* (2013.01); *C02F 1/442* (2013.01); *B01D 2313/501* (2022.08); *C02F 1/003* (2013.01); *C02F 1/283* (2013.01); *C02F 1/42* (2013.01); *C02F 1/444* (2013.01); *C02F 1/68* (2013.01); *C02F 2201/004* (2013.01); *C02F 2201/005* (2013.01); *C02F 2209/03* (2013.01); *C02F 2209/05* (2013.01); *C02F 2301/043* (2013.01); *C02F 2301/046* (2013.01); *C02F 2301/066* (2013.01); *C02F 2303/16* (2013.01)

(58) Field of Classification Search
  CPC .. C02F 1/008; C02F 1/283; C02F 1/42; C02F 1/441; C02F 1/442; C02F 1/444; C02F 1/68; C02F 2201/004; C02F 2201/005; C02F 2209/03; C02F 2209/05; C02F 2301/066; C02F 2303/16
  See application file for complete search history.

(56) References Cited

U.S. PATENT DOCUMENTS

| | | | |
|---|---|---|---|
| 3,794,172 | A | 2/1974 | Bray |
| 4,086,166 | A | 4/1978 | Martin |
| 4,176,063 | A | 11/1979 | Tyler |
| 4,243,523 | A | 1/1981 | Pelmulder |
| 4,414,113 | A | 11/1983 | LaTerra |
| 4,626,346 | A | 12/1986 | Hall |
| 4,704,210 | A | 11/1987 | Boze |
| 4,833,888 | A | 5/1989 | Kerner |
| 4,891,594 | A | 1/1990 | Wilfley |
| 4,921,610 | A | 5/1990 | Ford |
| 4,931,186 | A | 6/1990 | Ford |
| 4,935,143 | A | 6/1990 | Kopp |
| 4,973,404 | A | 11/1990 | Weber |
| 4,981,594 | A | 1/1991 | Jones |
| 4,983,301 | A | 1/1991 | Szuecz |
| 4,997,553 | A | 3/1991 | Clack |
| 5,024,762 | A | 6/1991 | Ford |
| 5,049,272 | A | 9/1991 | Nieweg |
| 5,266,203 | A | 11/1993 | Mukhopadhyay |
| 5,503,735 | A | 4/1996 | Vinas |
| 6,068,764 | A | 5/2000 | Chau |
| 6,093,312 | A | 7/2000 | Boulter |
| 6,103,125 | A * | 8/2000 | Kuepper .............. B01D 61/025 210/637 |
| 6,120,688 | A | 9/2000 | Daly |
| 6,162,361 | A | 12/2000 | Adiga |
| 6,190,558 | B1 | 2/2001 | Robbins |
| 6,290,856 | B1 | 9/2001 | Beall |
| 6,331,253 | B1 | 12/2001 | Schrive |
| 6,355,173 | B1 | 3/2002 | Den Bieman |
| 7,285,210 | B2 | 10/2007 | Schmitt |
| 7,338,595 | B2 | 3/2008 | VanNewenhizen |
| 7,601,256 | B2 | 10/2009 | Beall |
| 7,628,921 | B2 | 12/2009 | Efraty |
| 8,147,700 | B2 | 4/2012 | Elektorowicz |
| 8,652,331 | B2 | 2/2014 | Zha |
| 9,550,150 | B2 | 1/2017 | Smirnov |
| 10,399,870 | B2 | 9/2019 | Clark |
| 10,562,787 | B2 | 2/2020 | Hoek |
| 10,954,141 | B2 * | 3/2021 | Wilson .................. C02F 1/4691 |
| 11,439,955 | B2 | 9/2022 | Shmidt |
| 2002/0011443 | A1 | 1/2002 | Komatsu |
| 2002/0100716 | A1 | 8/2002 | Bosko |
| 2005/0023198 | A1 | 2/2005 | Halemba |
| 2005/0109703 | A1 | 5/2005 | Newenhizen |
| 2007/0062870 | A1 | 3/2007 | Chen |
| 2007/0151925 | A1 | 7/2007 | De Los Reyes |
| 2009/0113898 | A1 | 5/2009 | Kirol |
| 2009/0152197 | A1 | 6/2009 | Lilas |
| 2010/0018220 | A1 | 1/2010 | Modad |
| 2011/0180465 | A1 | 7/2011 | Richetti |
| 2011/0198275 | A1 | 8/2011 | Hayes |
| 2011/0303660 | A1 | 12/2011 | Yang |
| 2012/0048790 | A1 | 3/2012 | Voelker |
| 2012/0055858 | A1 | 3/2012 | Collins |
| 2012/0168368 | A1 | 7/2012 | De Los Reyes |
| 2012/0234739 | A1 | 9/2012 | Smirnov et al. |
| 2013/0126430 | A1 | 5/2013 | Kenley |
| 2013/0334115 | A1 | 12/2013 | Voelker |
| 2014/0061129 | A1 | 3/2014 | Hoz |
| 2014/0110337 | A1 | 4/2014 | Hoz |
| 2016/0046503 | A1 | 2/2016 | Hoek |
| 2017/0209834 | A1 | 7/2017 | Cohen |
| 2018/0251385 | A1 | 9/2018 | Clark |
| 2020/0140286 | A1 | 5/2020 | Hoek |
| 2020/0283309 | A1 | 9/2020 | Reid |
| 2022/0003218 | A1 | 1/2022 | Hager |
| 2022/0032218 | A1 | 2/2022 | Shmidt |
| 2022/0220007 | A1 | 7/2022 | Reid |

FOREIGN PATENT DOCUMENTS

| | | |
|---|---|---|
| CN | 107250063 | 10/2017 |
| CN | 108473341 | 8/2018 |
| CN | 108473342 | 8/2018 |
| DE | 102006015675 | 10/2007 |
| DE | 202011000680 | 9/2011 |
| DE | 16842406 | 11/2018 |
| DE | 16842407 | 11/2018 |
| EP | 0479492 | 4/1992 |
| EP | 1183212 A1 | 3/2002 |
| EP | 3241807 | 11/2017 |
| EP | 3345871 | 7/2018 |
| EP | 3345872 | 7/2018 |
| EP | 3372302 | 9/2018 |
| FR | 2940764 | 7/2010 |
| RU | 2004233 C1 | 12/1993 |
| RU | 2047330 | 11/1995 |
| RU | 2100295 | 12/1997 |
| RU | 20256 | 10/2001 |
| RU | 22434 U1 * | 4/2002 |
| RU | 2199377 | 2/2003 |
| RU | 2287490 | 11/2006 |
| RU | 2297389 | 4/2007 |
| RU | 2363663 | 9/2007 |
| RU | 2006105261 | 9/2007 |
| RU | 2323036 | 1/2008 |
| RU | 2006121054 | 1/2008 |
| RU | 2323766 | 5/2008 |
| RU | 74909 U1 | 7/2008 |
| RU | 2331586 C2 * | 8/2008 |
| RU | 89097 | 11/2009 |
| RU | 2421270 C1 | 6/2011 |
| RU | 2473472 | 1/2013 |
| RU | 2484884 C1 * | 6/2013 |
| RU | 2494971 | 10/2013 |
| RU | 2531392 | 10/2014 |
| RU | 2614705 | 3/2017 |
| RU | 2015137550 | 3/2017 |
| SU | 1764094 | 9/1992 |
| WO | 8502783 | 7/1985 |
| WO | 9947226 A1 | 9/1999 |
| WO | 0076639 | 12/2000 |
| WO | 02055182 | 7/2002 |
| WO | 2002055182 | 7/2002 |
| WO | 2010122336 | 10/2010 |
| WO | 2011110585 | 9/2011 |
| WO | 2012112045 | 8/2012 |
| WO | 2015083717 | 6/2015 |
| WO | 2015121821 | 8/2015 |
| WO | 2016108733 | 7/2016 |
| WO | 2017039485 | 3/2017 |

(56) References Cited

FOREIGN PATENT DOCUMENTS

OTHER PUBLICATIONS

Machine Translaton from the European patent office website of the description of RU 2331586 C2 (Year: 2008).*
Machine Translaton from the European patent office website of the description of RU 2484884 C1 (Year: 2013).*
International Search Report in corresponding International Application No. PCT/RU2015/000522, dated Dec. 24, 2015, 2 pages.
International Search Report for PCT/RU2015/000890 mailed Apr. 21, 2016, 1 page.
International Search Report for PCT/RU2016/000466 mailed Jan. 12, 2017; 1 page.
International Search Report for PCT/RU2016/000464 mailed Jan. 19, 2017; 1 page.
Supplemental European Search Report and Written Opinion for EP15875786 dated May 16, 2018; 7 pages.
International Search Report in corresponding International Application No. PCT/RU2015/000216, mailed Aug. 13, 2015, 3 pages.
International Report on Patentability in corresponding International Application No. PCT/RU2015/000216, mailed Jul. 8, 2015, 6 pages.
Supplemental European Search Report for EP15807541 mailed Feb. 15, 2018; 2 pages.
Supplemental European Search Report for EP3214046 dated May 16, 2018; 2 pages.
Written Opinion of the International Searching Authority for EP15807541 mailed Feb. 15, 2018; 5 pages.
Written Opinion of the International Searching Authority for EP3214046 dated May 16, 2018; 5 pages.
International Report on Patentability in corresponding International Application No. PCT/RU2015/000890 mailed Jul. 18, 2017; 6 pages.
International Extended Search Report in International Application No. PCT/RU2015/000890 mailed May 25, 2018; 6 pages.
Provisional Opinion and Partial Search Report for EP3345871, dated Apr. 16, 2019; 11 pages.
International Prelminary Report on Patentability and Written Opinion of the International Search Authority for PCT/RU2016/000466 issued Mar. 6, 2018; 5 pages.
European Search Opinion for EP3345872, dated Mar. 29, 2019; 4 pages.
WO2015121821; EPO Machine Translation (Year: 2020).
FR2940764A 1—EPO Machine Translation (Year: 2020).
International Search Report for PCT/RU2019/000309 dated Aug. 13, 2019; 2 pages.

* cited by examiner

LIQUID PURIFICATION SYSTEM

CROSS REFERENCE TO RELATED APPLICATIONS

This patent application is a continuation-in-part of International Application No. PCT/RU2015/000522 filed Aug. 18, 2015, which claims the benefit of Russian Patent Application No. 2014143176 filed Oct. 27, 2014, both of which are hereby incorporated by reference in their entireties.

TECHNICAL FIELD

The invention relates to purification and/or desalinization systems for a liquid, mainly water, used for household and/or drinking water supply in household and/or industrial environments, in summer houses and gardens.

BACKGROUND

Different liquid purification systems are known and are quite widespread.

An invention of patent EP 1183212 B1 (B01D 65/02, B01D 61/04, A61L 2/18, A61L 2/24, B01D 61/12, C02F 1/44, publ. 10.10.2007, Next RO Inc.) is known in the art. This liquid purification system with biological contamination prevention includes a source liquid supply, a purified liquid feed line to a consumer, a liquid purification unit including a liquid-liquid type container consisting of a body, a resilient chamber disposed within the body, a storage cavity for purified liquid formed by the walls of the resilient chamber, and a displacement cavity formed by the walls of the body and the resilient chamber, intended for drainage liquid, a liquid purification means, a drainage line, a liquid flow control system and a source liquid biocide treatment unit. The liquid flow control system includes a source liquid feed section and a purified liquid feed section, each including at least one liquid flow switching means in the form of a two-position valve. The inlet of the liquid purification means is connected to the source liquid feed section, the purified liquid outlet of the liquid purification means is connected to the purified liquid feed section, the drainage liquid outlet of the liquid purification means is connected to the drainage line. The purified liquid feed section is connected to the purified liquid outlet of the liquid purification means, to the storage cavity for purified liquid of the container, and to the purified liquid feed line to the consumer, and is provided with a two-position valve that closes the purified liquid feed line. The source liquid feed section has its inlet connected to the source liquid supply and its outlet connected to the liquid purification means, and is also coupled to the source liquid biocide treatment unit. The source liquid feed section is provided with a two-position valve responsive to a change in the pressure in the purified liquid feed section. The drainage line is connected to the drainage liquid outlet and to the displacement cavity for drainage liquid of the container, and is provided with a two-position valve which, like the valve in the source liquid feed section, is responsive to a change in the pressure in the purified liquid feed section, as well as with a pressure controller that maintains the pressure at a level that is necessary for the operation of the liquid purification means. When pressure in the purified liquid feed section drops, the two-position valves of the source liquid feed section and the drainage line switch to the "open" state to feed the source liquid to the liquid purification system and to feed the drainage liquid to the displacement cavity for drainage liquid of the storage container, respectively.

The system operates as follows. Source liquid from the source liquid supply flows to the inlet of the source liquid feed section. When the two-position valve of the source liquid feed section is open, the source liquid is fed to the inlet of the liquid purification means, whereby at least part of the liquid is passed through the liquid biocide treatment unit. After the liquid purification means, the purified liquid flows to the purified liquid feed section. When the two-position valve of the purified liquid feed section is closed, the purified liquid flows to the storage cavity for purified liquid of the container. When the two-position valve of the purified liquid feed section is open, the purified liquid flows to the purified liquid feed line to the consumer, whereby liquid pressure in the purified liquid feed section drops. When the pressure drops to a predetermined level which is defined by the design of the valve, the valve of the source liquid feed section opens, source liquid flows into the liquid purification system, at the same time the drainage line valve opens, whereby drainage liquid produced in the process of liquid purification flows via the drainage line to the displacement cavity for drainage liquid of the container, thereby displacing the purified liquid from the storage cavity for purified liquid via the purified liquid feed section to the purified liquid feed line to the consumer. If the two-position valve of the purified liquid feed section is closed, all purified liquid flows to the storage cavity for purified liquid of the container, until the pressure in the purified liquid feed section reaches a limit. At this moment the valves in the source liquid feed section and the drainage line are closed, the liquid purification process is stopped.

It is a drawback of the above-mentioned invention that, when liquid flows through the feed assemblies and the liquid purification means, the source liquid pressure gradually drops, and hence the rate at which the purified liquid is fed to the consumer also drops. The purified liquid stays in the storage cavity for purified liquid of the container under the pressure, under which it arrives to the latter after the liquid purification means, which pressure is lower than the pressure of source liquid that flows from the source liquid supply. In order to provide for necessary rate of purified liquid supply for consumption, it is necessary to intermittently pump drainage liquid to the displacement cavity for drainage liquid of the container. Besides, it is a drawback of the above-mentioned invention that the main element of the liquid flow control system is a valve which is responsive to pressure change, which causes an inertness of the system since, for the valve to switch, it is necessary that the pressure changes by a value that is no less than a predetermined one, which is defined by the design of the valve.

An invention of U.S. Pat. No. 6,068,764 (B01D 61/10, F04B 35/00, F04B 7/02, publ. 30.05.2000, Yin Chau Chau) is known in the art. This liquid purification system includes a source liquid supply, a purified liquid feed line to a consumer, a liquid purification unit including a liquid flow control system, a liquid purification means, a storage container for purified liquid, a post-filter. The flow control system is comprised of a purified liquid feed section, a source liquid feed section and a flow switching means. The flow switching means is a body divided into three chambers: a control chamber, a pumping chamber, a liquid feed chamber. The control chamber has a drainage liquid inlet which is connected to the drainage liquid outlet of the liquid purification means, and a drainage liquid discharge outlet. Also a control mechanism is disposed in the control chamber, e.g. a hydraulic turbine or a hydraulic turbine provided with a motor, a gear train and a drive shaft which is embedded in the pumping chamber. The motor is mounted on the hydraulic turbine to provide predetermined pressure within the liquid purification means. A piston with an O-ring is disposed in the pumping chamber that divides the chamber into two cavities. The piston moves within the pumping chamber in an alternating manner into and out of the two cavities. An inlet hose for purified liquid, which is connected to the purified liquid outlet of the liquid purification means, is disposed within the body of the flow control means. Two purified liquid lines, each connected to one of the cavities of the pumping chamber, extend from the hose. Each purified liquid line is provided with a non-return valve for the liquid to flow only into the cavities of the pumping chamber but not in the reverse direction. Both cavities of the pumping chamber are provided with outlet hoses for purified liquid. Both hoses are equally connected to the liquid feed chamber and with the purified liquid outlet port which is coupled to the storage container for purified liquid and to the purified liquid feed line to the consumer via the purified liquid feed section. The source liquid feed chamber also has a source liquid inlet connected to the source liquid supply via a pre-filter, and a source liquid outlet connected to the inlet of a fine liquid purification means via the source liquid feed section. The source liquid feed chamber comprises a piston connected to a spring.

The liquid purification system operates as follows. When the system is switched on, the storage container is almost completely empty and ready to be filled with purified liquid. Source liquid flows to the inlet of the source liquid feed chamber. As the force of the spring connected to the piston of the source liquid feed chamber is smaller than source liquid pressure at the inlet of the source liquid feed chamber, the piston moves, thus letting the source liquid to flow via the source liquid feed section to the source liquid inlet of the liquid purification means. Drainage liquid flows to the control chamber after the liquid purification means, and, after actuating the hydraulic turbine with the gear train and the drive shaft, is drained. After the liquid purification means, purified liquid flows to the purified liquid hose of the flow control means and proceeds to one of the cavities of the pumping chamber via purified liquid lines. Under the effect of the drainage liquid, the drive shaft rotates and moves the piston. When the piston moves, the valve in one of the purified liquid feed lines intermittently opens, and purified liquid is sucked into one of the cavities of the pumping chamber, and purified liquid is pushed out of the other one of the cavities of the pumping chamber, the valve opens and purified liquid is fed into the purified liquid feed section. From the purified liquid feed section, purified liquid flows either to the storage container for purified liquid or to the purified liquid feed line to the consumer.

Thus, the flow control system includes a flow control means in the form of a modified hydro automatic unit, in which liquid flows are switched by two piston arrangements, one of which is driven by the drive shaft of the hydraulic turbine and the other one is driven by the source liquid from the supply. It should be noted that source liquid flows to the inlet of the liquid purification means under pressure which is present in the supply. The hydraulic turbine with the gear train and the drive shaft is necessary only for pumping the purified liquid and is driven by the force of drainage liquid. When pressure in the supply drops, pressure in the liquid purification means will also drop, and so will the rate of drainage liquid flow at the outlet of the liquid purification means and the force of drainage liquid would be insufficient to actuate the hydraulic turbine, and so the system operation would fail. In order to eliminate the above-mentioned problem, the motor is mounted in the hydraulic turbine, which complicates its structure. Besides, the gear train may be jammed in the process of operation, which would cause a failure of piston operation, flood one of the chambers with purified liquid, and lead to the breakdown of the whole system.

A prior art liquid purification system is known from U.S. Pat. No. 7,285,210 (A61M 1/16, B01D 61/08, B01D 61/12, B01D63/00, publ. 23.10.2007, Watts Regulator Co., US). The liquid purification system without drainage discharge includes a hot liquid supply, a cold source liquid supply, hot and cold liquid angle valves, a purified liquid feed line to a consumer, a liquid purification unit including a storage container for purified liquid, a liquid purification means, a drainage line, a cold source liquid feed section provided with a pressure increasing means in the form of a pump arrangement which includes a pump, and an electromagnetic valve, connected to a pressure sensor, a purified liquid feed section.

The cold source liquid supply is connected to an inlet of the liquid purification means via a source liquid feed section. A purified liquid outlet of the liquid purification means is connected to an inlet of the purified liquid feed section. A drainage liquid outlet of the liquid purification means is connected to the hot liquid feed supply.

An inlet of the purified liquid feed section is connected to an inlet of the storage container. An outlet of the purified liquid feed section is connected to the purified liquid feed line to the consumer via a post-filter. The storage container for purified liquid is a tank in which purified liquid is held under the pressure, under which it flows out from the liquid purification means.

The liquid purification system without drainage discharge operates as follows. To obtain purified liquid, the user needs to close the hot and cold source liquid feed tap. When the cold purified liquid tap is opened, cold purified liquid flows from the purified liquid storage container to the purified liquid feed line to the consumer. Purified liquid stays in the storage container under the pressure with which it flows from the liquid purification means. When at least part of purified liquid is fed to the consumer, pressure in the storage container falls below a predetermined value which shows that the storage container is full. At this moment the pressure sensor opens the electromagnetic valve and the pump begins pumping purified liquid into the storage container for purified liquid. Each portion of purified liquid passes through the purified liquid feed section only once. Drainage liquid flows via the drainage liquid line to the hot liquid source coupled to the hot liquid feed tap. Thus, instead of discharging the drainage liquid the latter is mixed with hot liquid which then flows to the consumer. The liquid purification process goes on until the storage container for purified liquid is completely filled and the pressure therein reaches the predetermined value. At that moment the pressure sensor closes the electromagnetic valve and shuts down the pump. The system is ready to feed the purified liquid to the consumer.

Purified liquid flows from the storage container to the purified liquid feed line to the consumer under the same pressure with which it flowed into the storage container, wherein for the purified liquid to be uniformly fed to the consumer it is necessary to maintain said pressure in the storage container at the predetermined value, and the only means for that consists in intermittent pumping the purified liquid under pressure to the storage container. Besides, in the invention of U.S. Pat. No. 7,285,210, when the drainage liquid is mixed with hot liquid, the level of contamination of the hot liquid, which is also fed to the consumer, increases.

An invention of U.S. Pat. No. 7,601,256 B2 (B01D 63/00, B01D 61/00, publ. 13.10.2009, Next RO, Inc.) is known in the art, which was chosen by the applicants as the closest prior art. This liquid purification system comprises a source liquid supply, a purified liquid feed line to a consumer, a liquid purification unit including a liquid-liquid type container that consists of a body, a resilient chamber disposed within the body, a storage cavity for purified liquid defined by the walls of the resilient chamber, and a displacement cavity defined by the walls of the body and the walls of the resilient chamber, which cavity is intended for drainage liquid, a liquid purification means, a liquid flow control system including a source liquid feed section, a liquid flow switching means in the form of a hydro automatic unit, and a purified liquid feed section. Source liquid supply is connected via the source liquid feed section to an inlet of the liquid purification means, which has its purified liquid outlet connected to the purified liquid feed section and the hydro automatic unit, wherein a drainage liquid outlet of the liquid purification means is connected to the hydro automatic unit. The purified liquid feed section is connected to the storage cavity for purified liquid and to the purified liquid feed line to the consumer. The hydro automatic unit is in the form of four chambers separated by a piston arrangement.

The liquid purification system operates as follows. When the purified liquid supply line to the consumer is closed, all purified liquid flows to the cavity for purified liquid under a pressure which is approximately equal to a pressure in the source liquid supply, wherein the piston arrangement moves under the effect of the purified liquid pressure, which results in closing the liquid inlet and outlet of the other three chambers. When the purified liquid feed line to the consumer is opened, the pressure in the storage cavity for purified liquid falls, therefore drainage liquid pressure becomes sufficient to move the piston into position in which drainage liquid flows to the displacement cavity for drainage liquid of the container. When the drainage liquid flows into the displacement cavity for drainage liquid of the container, it displaces the purified liquid from the storage cavity for purified liquid of the container into the purified liquid feed line to the consumer. When the purified liquid feed line to the consumer is closed, pressure in the storage cavity for purified liquid of the container and in the purified liquid distribution section increases. The piston arrangement of the hydro automatic unit moves and opens the drainage discharge chamber. As the source liquid flows to the liquid purification means under the same pressure, under which source liquid is fed from the source liquid supply, purified liquid flows to the storage cavity for purified liquid of the container under a pressure which does not exceed the source liquid pressure but is sufficient to displace the drainage liquid from the displacement cavity for drainage liquid of the container into the drainage, and to fill the storage cavity for purified liquid of the container with purified liquid. When the purified liquid pressure in the storage cavity for purified liquid of the container reaches a certain value, the above-mentioned piston moves into the initial position.

It may be seen from the aforementioned that the main element of the flow control system in the liquid purification system of U.S. Pat. No. 7,601,256 is the hydro automatic unit which not only provides for the switching of the flows but also feeds the drainage liquid into the displacement cavity for drainage liquid of the container so as to intermittently displace the purified liquid from the storage cavity for purified liquid of the container. The flow switching is realized in the hydro automatic unit of the flow distribution system by moving the piston arrangement. In case the piston fails or is clogged, a system operation failure may occur as it is not possible to provide the necessary switching of the chambers. Besides, the described flow control system has a complicated structure which is the main drawback of the closest prior art.

SUMMARY

The object of the invention and the technical result achieved by using the invention consists in designing a novel liquid purification system which provides improving reliability of the liquid purification system and simplifying its structure, while improving its performance properties, in particular by providing the purified liquid feed to the consumer at any stage of the liquid purification process and after the latter is completed.

The above object and the necessary technical result are achieved by a liquid purification system comprising a source liquid supply, a purified liquid feed line to a consumer, a liquid purification unit including a liquid-liquid type container consisting of a body and a means that defines a storage cavity for purified liquid and a displacement cavity, said means disposed within the body, at least one liquid purification means, a drainage line and a liquid flow control system including a source liquid feed section and a purified liquid feed section, wherein said liquid purification system is designed such that, in the liquid purification unit, the liquid flow control system is configured with a source liquid distribution section arranged for maintaining liquid pressure in the displacement cavity, intended mainly for source liquid, of the container, higher than atmospheric pressure, wherein the source liquid distribution section has a contra-flow liquid movement arrangement and includes a source liquid recirculation line connected on one end with the displacement cavity for source liquid of the container and on the other end with the source liquid supply and the source liquid feed section, or wherein the source liquid distribution section has a two-line arrangement in the form of a source liquid feed line to the displacement cavity for source liquid of the container, having its inlet connected to the source liquid supply and its outlet connected to the displacement cavity for source liquid of the container, and a source liquid displacement line from the displacement cavity of the container, having its inlet connected to the displacement cavity of the container and its outlet connected to the source liquid feed section, and wherein the source liquid feed section of the liquid flow control system, having its inlet connected to the source liquid distribution section and its outlet connected to the liquid purification means, further comprises a pressure increasing means that produces pressure which is conveyed via the liquid purification means and the purified liquid feed section to the storage cavity for purified liquid of the container, and exceeds the pressure maintained in the displacement cavity for source liquid of the container, and wherein the purified liquid feed section of the liquid flow control system has its inlet connected to the liquid purification means and its outlet connected to the purified liquid feed line to the consumer and to the storage cavity for purified liquid of the container, and wherein the means that defines the storage cavity for purified liquid and the displacement cavity, disposed within the body of the liquid-liquid type container, is made of a polymer material and adapted to reversibly change its shape in the process of liquid purification, substantially taking the shape of the body of the container.

The above object and the necessary technical result are achieved by the liquid-liquid type container further comprising a liquid mineralization means disposed mostly within the storage cavity for purified liquid and coupled to the outlet of the liquid purification means and the purified liquid feed line to the consumer via the purified liquid feed section.

The above object and the necessary technical result are also achieved by the liquid purification system further including a drainage liquid recirculation line having its inlet connected to the liquid purification means and its outlet connected to the source liquid feed section of the liquid flow control system or to the displacement cavity for source liquid of the container, wherein the drainage liquid recirculation line further includes at least one liquid purification means and is adapted to perform flushing the liquid purification means, as the drainage liquid recirculation line is further provided with a flow switching means in the form of e.g. at least one shutoff valve or electromagnetic valve. Besides, the drainage line of the liquid purification system further comprises a source liquid concentration level adjustment means which is e.g. at least one shutoff valve or restrictor, the liquid purification system also comprising an automatic liquid filtration process stopping means for when a predetermined amount of purified liquid in the storage cavity for purified liquid of the container is reached, which means is e.g. a high-pressure control switch and/or a shutoff valve. Also the system further includes at least one source liquid pressure reduction means that is disposed at the outlet of the source liquid supply and/or in the distribution section of the liquid flow control system, and/or in the source liquid feed section of the liquid flow control system.

DETAILED DESCRIPTION

Figure 1:
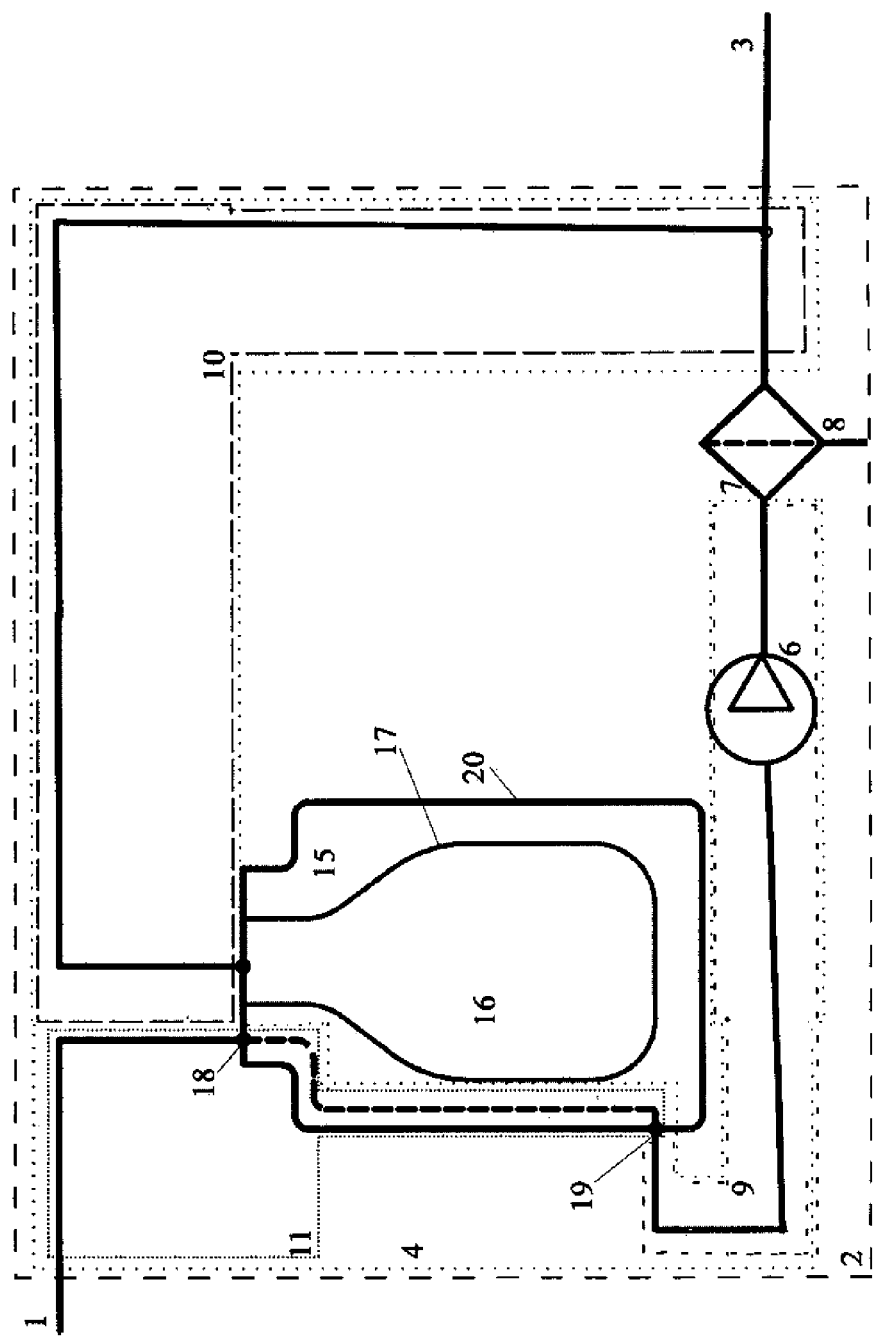
FIG. 1 shows a scheme of an embodiment of the liquid purification system with the distribution section in the form of a two-line arrangement.

The liquid purification system (FIGS. 1, 2) includes a source liquid supply (1), a liquid purification unit (2), a purified liquid feed line (3) to the consumer.

The source liquid supply (1) is e.g., but not limited to the mentioned, a water supply system or a liquid feed line from a water body (not shown in the figures) (e.g. a lake or a water storage basin) or a tank (not shown in the figures) (e.g. a source liquid container) including a pressure increasing pump (not shown in the figures).

The liquid purification unit (2) includes a liquid-liquid type container (5), at least one liquid purification means (7), a liquid flow control system (4), a drainage line (8).

Figure 3:
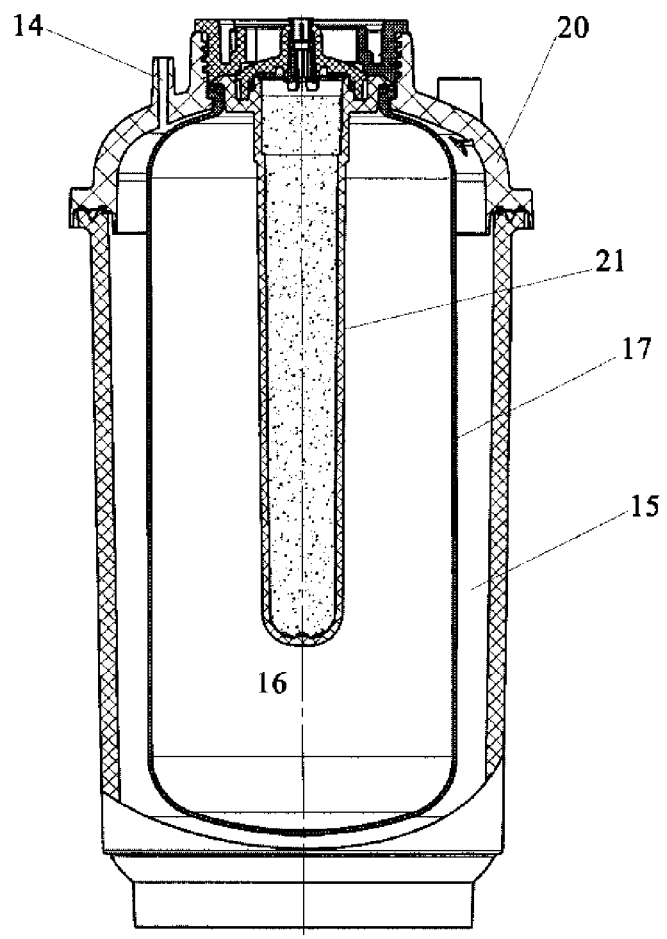
FIG. 3 shows an embodiment of the liquid-liquid type container consisting of a body and a means that defines the storage cavity for purified liquid and the displacement cavity, disposed within the body and made in the form of a chamber of a polymer material, and further including a mineralization means.

The liquid-liquid type container (5) is e.g., but not limited to, a body (20) and a means (17) that defines a storage cavity (16) for purified liquid and a displacement cavity (15), disposed within the body (20). Said means (17) disposed within the body (20) is made of a polymer material, e.g., but not limited to, polyolefins, e.g. polyethylene or polypropylene, ethylene copolymer or vinyl acetate, as well as caoutchouc, silicone, polyamides, polystyrenes and their mixtures in various ratios, and is capable of reversibly changing its shape in the process of liquid purification, substantially taking the shape of the body (20) of the container (5), and to convey pressure. The means (17) may be made e.g., but not limited to, in the form of a membrane that divides the cavity within the body (20) into the storage cavity (16) for purified liquid and the displacement cavity (15) (FIG. 4), or a chamber that defines the storage cavity (16) for purified liquid (FIG. 3). The displacement cavity (15) of the container (5) is coupled to the source liquid supply (1) via the liquid flow control system (4), such that, unlike the closest prior art, the displacement cavity (15) of the container (5) advantageously contains source liquid and not drainage one. Therefore the present invention does not require coupling the displacement cavity to a drainage line, which, in the case of the closest prior art, causes an intermittent drop in the liquid pressure in the displacement cavity to the level of atmospheric pressure. Furthermore, for the purified liquid to flow to the consumer, the pressure in the displacement cavity should be greater than atmospheric pressure, thus, in the closest prior art, purified liquid may be fed to the consumer intermittently and only at certain times in the liquid purification process, and in the invention liquid may be fed to the consumer at any time in the liquid purification process. Therefore the invention has improved consumer performance.

The liquid flow control system (4) includes a source liquid feed section (9), a purified liquid feed section (10), and, unlike the closest prior art, a source liquid distribution section (11). The presence of the source liquid distribution section in the liquid flow control system (4) provides for distribution and redirection of source and purified liquid flows without using a hydro automatic unit, unlike the closest prior art. Thus, the inventive liquid flow control system (4) is free from limitations related to the use of liquid control system based on piston movement. That is, e.g. distribution and redirection of liquid flows in the invention takes place in case of any change in the pressure in the liquid purification system, unlike the closest prior art where liquid flows are switched only when the pressure changes no less than by the minimum piston operation pressure value.

The source liquid distribution section (11) of the liquid flow control system (4) is configured (FIG. 2) e.g., but not limited to the mentioned embodiments, in the form of contraflow liquid flow arrangement and includes a source liquid recirculation line (12), a T-joint fitting (13) and a coupling means (14) to the displacement cavity (15) for source liquid of the container (5). The coupling means (14) is made e.g., but not limited to, in the form of a hose or a fitting. For example, another embodiment of the source liquid distribution section (11) is possible (FIG. 1), where the source liquid distribution section (11) has a two-line arrangement in the form of a source liquid inlet line (18) and a source liquid displacement line (19). The source liquid inlet line (18) has its inlet connected to the source liquid supply (1), and the outlet of the source liquid inlet line (18) is coupled either to the displacement cavity (15) for source liquid of the container (5) or to the source liquid displacement line (19) and to the displacement cavity (15) for source liquid of the container (5). In its turn, the source liquid displacement line (19) has its inlet coupled either to the displacement cavity (15) for source liquid of the container (5), or to the displacement cavity (15) for source liquid of the container (5) and to the source liquid inlet line (18), and its outlet coupled to the source liquid feed section (9).

The purified liquid feed section (10) of the liquid flow control system (4) has one inlet for coupling to the liquid purification means (7) and two outlets: for coupling to the purified liquid feed line (3) to the consumer and for coupling to the storage cavity (16) for purified liquid of the container (5).

The source liquid feed section (9) of the liquid flow control system (4) has its inlet connected to the source liquid distribution section (11) and its outlet connected to the liquid purification means (7), and includes a pressure increasing means (6) configured as e.g., but not limited to, a pump or a system of pumps. Unlike the closest prior art, the function of source liquid feed section (9) is not limited to feeding source liquid, which flows to the liquid flow control system (4) from the source liquid supply (1), to the liquid purification means (7). According to the invention, the source liquid feed section (9) also performs the function of producing pressure that is conveyed via the liquid purification means (7) and the purified liquid feed section (10) of the liquid flow control system (4) to the storage cavity (16) for purified liquid of the container (5). In the meantime, said pressure exceeds the pressure that is maintained in the displacement cavity (15) for source liquid of the container (5).

The liquid flow control system (4) and the container (5) are configured and connected to each other such that when the displacement cavity (15) for source liquid is filled, the source liquid keeps the pressure that existed in the source liquid supply (1) and that is greater than atmospheric pressure. Furthermore, source liquid is displaced from the displacement cavity (15) for source liquid of the container (5) by way of filling the storage cavity (16) for purified liquid of the container (5) with purified liquid that is under pressure produced by the source liquid feed section (9) and exceeding the pressure of the source liquid. The source liquid displaced from the cavity (15) flows via the source liquid distribution section (11) to the source liquid feed section (9), and not to the drainage line (8) as in the closest prior art, which has its outlet (not shown in the figures) intermittently opened for discharge. Thus, the source liquid pressure in the displacement cavity (15) for source liquid of the container (5) is maintained to be greater than atmospheric pressure.

The liquid purification means (7) is e.g., but not limited to, a membrane element (a reverse osmosis membrane or a nanofiltration membrane in a housing) or a cascade of membrane elements (FIGS. 1, 2, 5, 6).

The purified liquid feed line (3) to the consumer includes a purified liquid feed means to the end consumer (not shown in the figures), arranged e.g., but not limited to, in the form of a pure liquid tap or a shutoff valve. The purified liquid feed line (3) to the consumer may further include at least one storage container for purified liquid intended for forming purified liquid stores and being e.g., but not limited to, an open-type container, a free-flow container or a liquid-air type tank (not shown in the figures).

The source liquid supply (1) is coupled to the liquid purification unit (2), wherein the outlet of the source liquid supply (1) is connected to the inlet of the liquid distribution section (11) of the flow control system (4) of the liquid purification unit (2). In its turn, the liquid distribution section (11) has two outlets, coupled to the source liquid feed section (9) and the displacement cavity (15) for source liquid of the container (5), through which the source liquid is distributed among the source liquid distribution section (11) and the displacement cavity (15) for source liquid of the container (5). The source liquid feed section (9) has its inlet coupled to the source liquid distribution section (11) and its outlet coupled to the inlet of the liquid purification means (7) which, in its turn, has a purified liquid outlet coupled to the inlet of the purified liquid feed section (10) of the flow control system (4), and a drainage liquid outlet coupled to the drainage line (8). The purified liquid feed section (10), which has its inlet connected to the liquid purification means (7), has two outlets: an outlet coupled to the purified liquid feed line (3) to the consumer and an outlet coupled to the storage cavity (16) for purified liquid of the container (5). The pressure increasing means (6) included in the source liquid feed section (9) produces a pressure that is conveyed via the liquid purification means (7) and the purified liquid feed section (10) in the storage cavity (16) for purified liquid of the container (5), which exceeds the pressure in the displacement cavity (15) for source liquid of the container (5). Purified liquid flows via the purified liquid feed line (3) to the consumer.

In the scope of the distinguishing features, embodiments with additional capabilities of the above-mentioned liquid purification systems are possible.

The liquid-liquid type container (5) of the liquid purification system may further comprise a liquid mineralization means (21) (FIGS. 3, 4) made in the form of a housing of a hardened mesh or a housing with openings (not shown in the figures) filled e.g., but not limited to the mentioned embodiments, with dolomite, calcite or charred dolomite. The top part (not shown in the figures) of the mineralization means (21) is attached to a throat (not shown in the figures) of the body (20) of the container (5), ant the greater part of the mineralization means (21) is disposed in the storage cavity (16) for purified liquid of the container (5). The mineralization means (21) is coupled to the purified liquid feed section (10) of the liquid flow control system (4) such that when purified liquid is fed from the liquid purification means (7) via the purified liquid section (10) into the storage cavity (16) for purified liquid of the container (5), as well as when the purified liquid is fed from the storage cavity (16) for purified liquid of the container (15) via the purified liquid feed section (10) to the purified liquid feed line (3) to the consumer, at least a part of the purified liquid flows through the mineralization means (21). Also the purified liquid in the storage cavity (16) for purified liquid of the container (5) interacts with the mineralization material contained in the mineralization means (21).

The above-mentioned container (5) configured to mineralize liquid by having the mineralization means (21) may be used not only in the invention described herein but in any liquid purification system that includes a liquid-liquid type container.

The liquid purification system may further comprise at least one source liquid pressure reduction means (30) (FIG. 6) which is a low-pressure control switch and a regulator (not shown in the figures), and which enables reducing the pressure of the source liquid, flowed from the source liquid supply, to a predetermined level which is safe for the end consumer. The source liquid pressure reduction means (30) may be disposed e.g. at the outlet of the source liquid supply (1) and/or in the source liquid distribution section (11) of the liquid flow control system (4), and/or in the source liquid feed section (9) of the liquid flow control system (9).

Figure 6:
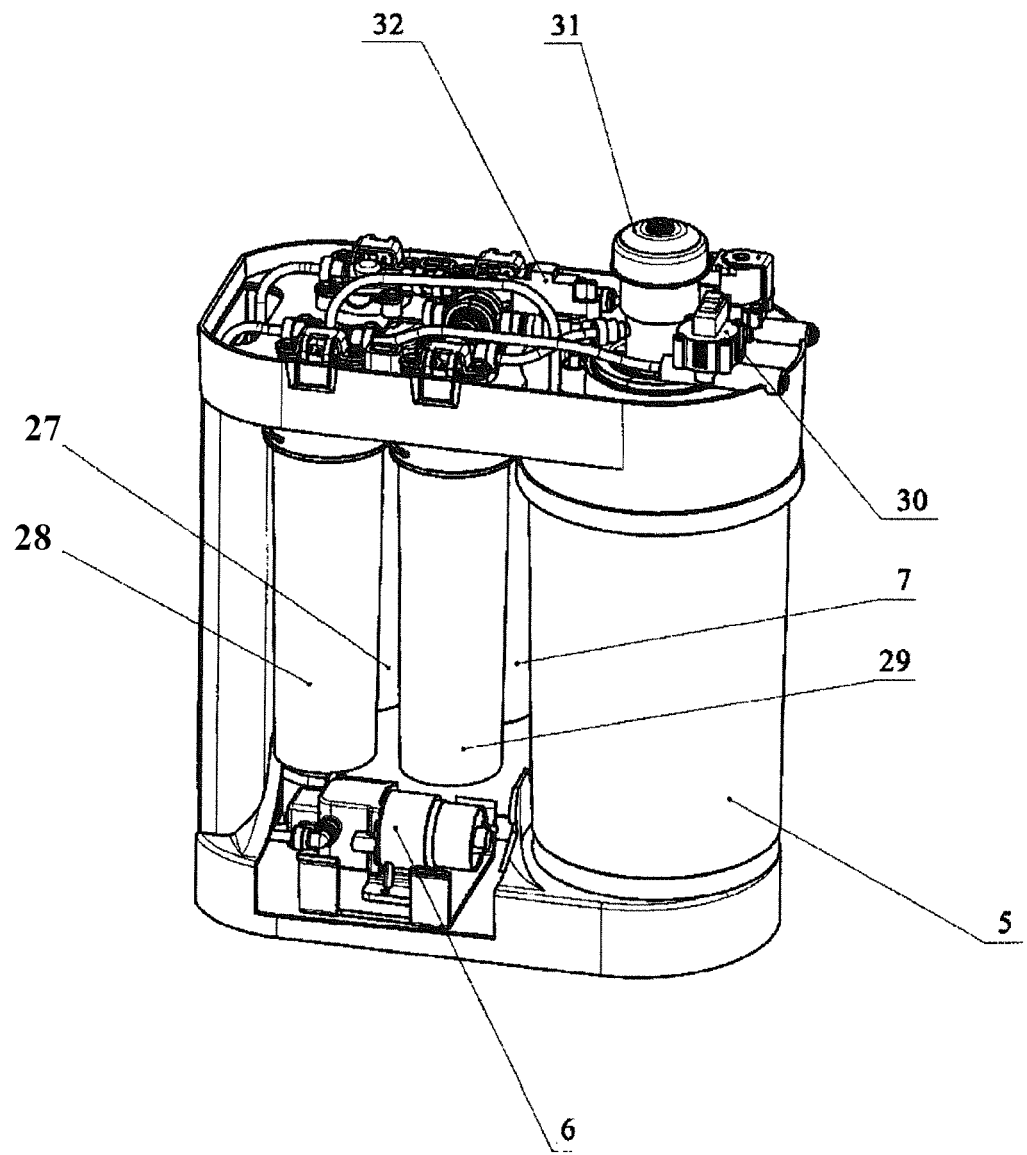
FIG. 6 shows an axonometric projection of the liquid purification system.

Also, at least one preliminary mechanical liquid purification means (27) may be further disposed at the outlet of the source liquid supply (1) and/or in the source liquid feed section (9), in the form e.g., but not limited to the mentioned embodiments, a filter element of foamed polypropylene and a coil-type mechanical purification element (FIG. 6). Besides, at least one preliminary sorption liquid purification means (28) may be disposed at the outlet of the source liquid supply (1) in the form of e.g. a filter element with a sorption mixture based on activated carbon and ion exchange resins.

Figure 5A:
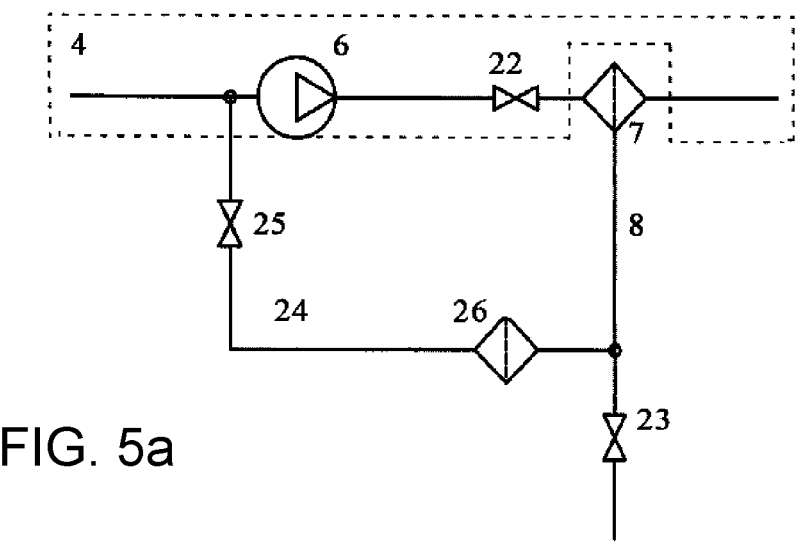
FIGS. 5a and 5b show embodiments of a recirculation line of the liquid purification system and a drainage line of the liquid purification system, adapted to perform flushing the liquid purification means and to adjust the source liquid concentration level.
Figure 5B:
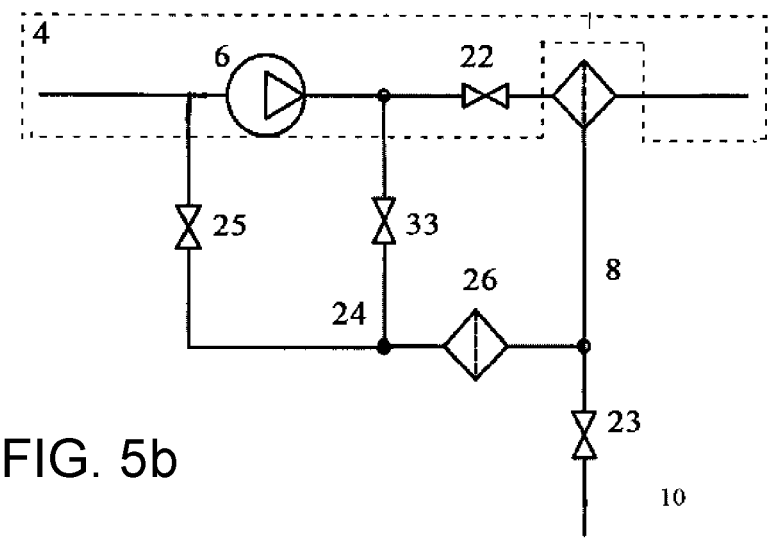
Figure 7:
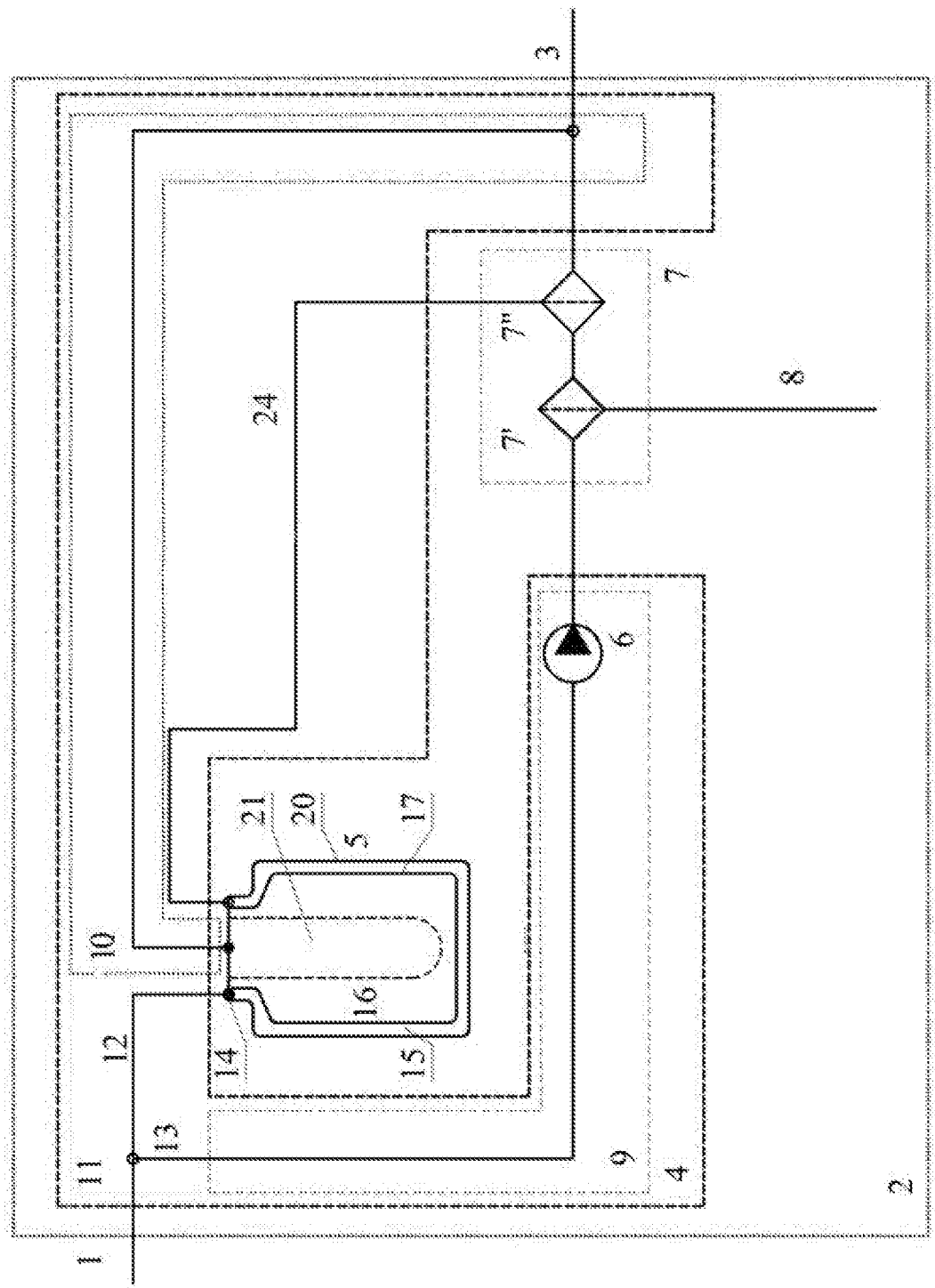
FIG. 7 shows an embodiment of the liquid purification means where liquid purification means contains of two elements.

The liquid purification unit (2) may further have a recirculation of drainage function. The recirculation can be fulfilled in two ways. First one is when the inlet of drainage liquid recirculation line (24) (FIG. 5) is coupled to the drainage line (8), and outlet—to the source liquid feed section (10)(FIG. 5). The second one is when the inlet of the drainage liquid recirculation line (24) (FIG. 5) is coupled to the outlet of the drainage of the liquid purification means (7) and the outlet of the drainage liquid recirculation line (24) is coupled to the displacement cavity (15) for source liquid of the container (5) (FIG. 7). Said recirculation line (24) may further include at least one liquid flow adjustment means (25) (FIG. 5a) or at least two liquid flow adjustment means (25, 33) (FIG. 5b) which are e.g., but not limited to, an electromagnetic or shutoff valve and/or a restrictor. Also said recirculation line (24) may include at least one liquid purification means (26) (FIG. 5) in the form of e.g. a hollow-fiber ultra- or microfiltration module. Furthermore, the recirculation line (24) is configured for back-flushing the liquid purification means (26) with source liquid. Said recirculation line that includes the liquid purification means (26) and is configured for back-flushing (FIG. 5) may be used not only in the claimed liquid purification system but in any fine liquid purification system with recirculation.

In case when the outlet of recirculation line (24) is coupled to the displacement cavity (15) for source liquid of the container (5)(FIG. 7), the liquid purification means (7) may also contain two elements—(7') and (7") and the inlet of the recirculation line (24) is coupled to the drainage outlet of the element (7").

Also the liquid purification system may further comprise at least one source liquid concentration level adjustment means (22, 23) (FIG. 5) in the form of a valve, disposed in the source liquid feed section (10) before (not shown in the figures) and/or after (FIG. 5) the pressure increasing means (6) and/or in the drainage line (8). In this case the source liquid concentration level adjustment means (22) disposed in the source liquid feed section (10) may further perform the function of an automatic liquid filtration process stopping means for stopping the liquid filtration process when a predetermined amount of purified liquid is reached. Said automatic liquid filtration process stopping means may also be in the form of e.g. a high-pressure control switch (32), wherein an embodiment of the liquid purification system is possible, in which both of said automatic liquid filtration process stopping means are provided concurrently. The source liquid concentration level adjustment means (23) disposed in the drainage line (8) may further perform the function of the liquid flow adjustment means via the drainage line (8). Said liquid flow adjustment means via the drainage line (8) may also be made in the form of at least one restrictor or shutoff valve, wherein said liquid flow adjustment means may be provided in the liquid purification system concurrently. For the process of source liquid concentration level adjustment process to be automated, the liquid purification unit (2) may further include a liquid salt content sensor (not shown in the figures).

The purified liquid feed line (3) to the consumer may further include at least one purified liquid conditioning means (29), e.g., but not limited only to the mentioned embodiments, a sorption or hollow-fiber post-filter (29) and/or a purified liquid mineralization means (31) (FIG. 6). Embodiments of the liquid purification system with multiple mineralization are also possible, which concurrently include the liquid-liquid type container (5) provided with the mineralization means (21), and the purified liquid mineralization means (31) disposed in the purified liquid feed line (3) to the consumer.

In the scope of the distinguishing features, the reverse osmosis liquid purification system is intended to implement the following liquid filtration process.

Figure 2:
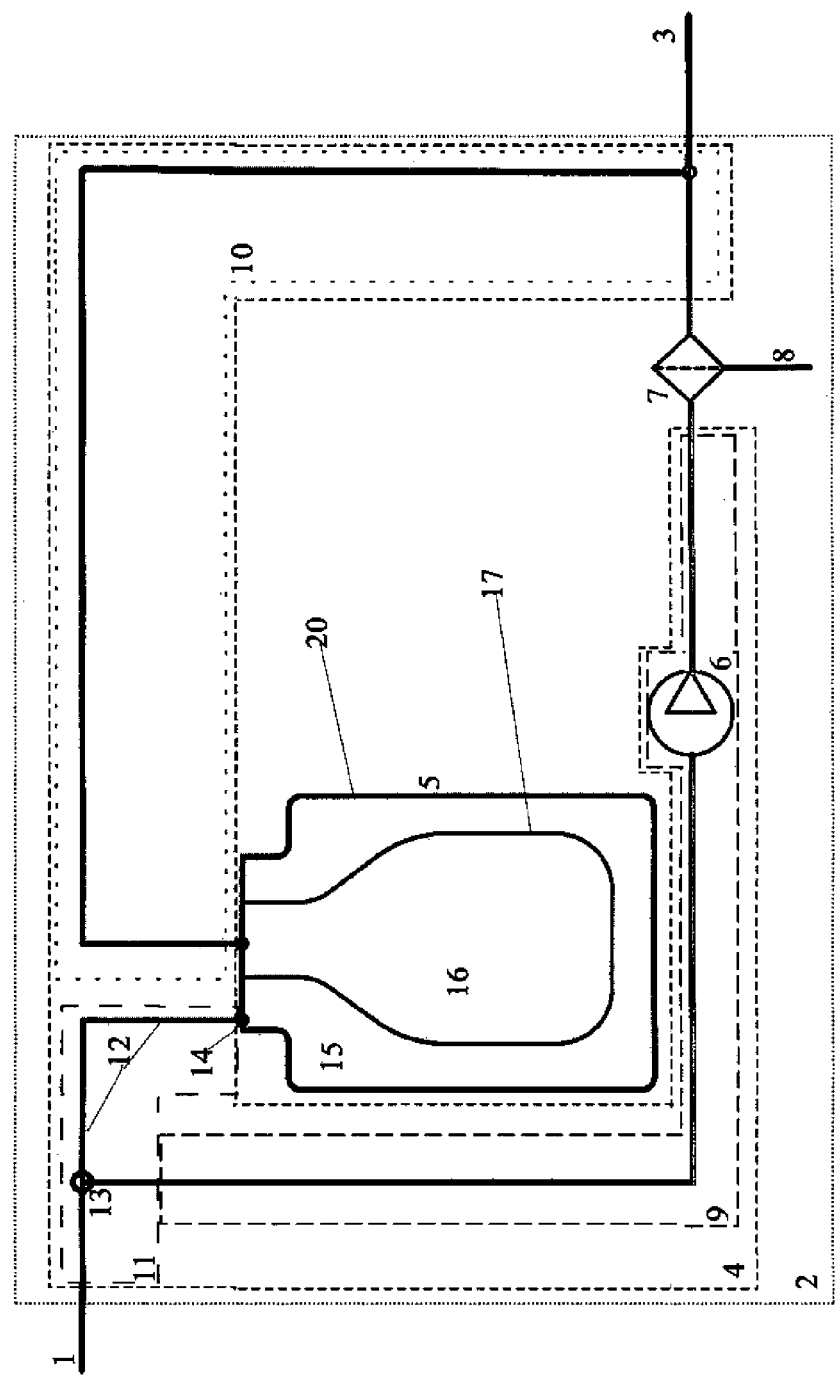
FIG. 2 shows a scheme of an embodiment of the liquid purification system with the source liquid distribution section in the form of a contraflow arrangement.

Source liquid flows from the source liquid supply (1) (FIGS. 1, 2) under a pressure that exceeds atmospheric pressure, into the source liquid distribution section (11) of the flow control system (4) of the liquid purification unit (2). Furthermore, if a pressure reduction means (30) (FIG. 6) is provided at the inlet of the source liquid distribution section (11), source level pressure value may be adjusted to the predetermined level in accordance with safety requirements, whereas the source liquid pressure remains greater than atmospheric pressure. Source liquid flows from the source liquid supply (1) under a pressure that is greater than atmospheric pressure into the liquid purification unit (2) via the source liquid distribution section (11) and, being divided into two flows, flows to the displacement cavity (15) for source liquid and to the source liquid feed section (9). The source liquid that flows to the displacement cavity (15) for source liquid of the container (5) (first flow) is under a pressure that exceeds atmospheric pressure, and fills the displacement cavity (15) for source liquid of the container (5), whereby a pressure that exceeds atmospheric pressure is produced in the container (5). The second flow of source liquid flows in the source liquid feed section (9) to the pressure increasing means (6) where the liquid pressure is increased up to the level that is necessary for the source liquid to pass through the liquid purification means (7). At the outlet of the liquid purification means (7), drainage liquid leaves the system via the drainage line (8) and purified liquid is fed to the purified liquid feed section (10). (FIGS. 1, 2, 6). In the meantime, if the liquid feed means to the consumer (not shown in the figures) in the liquid purification unit (2) is in a position of "liquid feed to the consumer", then, after the liquid purification means (7), the purified liquid is divided into two flows: one flow of purified liquid is directed to the storage cavity (16) for purified liquid of the container (5), and the second flow is directed to the purified liquid feed line (3) to the consumer. If, however, the liquid feed means to the consumer (not shown in the figures) in the liquid purification unit (2) is in a position of "liquid feed to the consumer is closed", then, after flowing from the liquid purification means to the purified liquid feed section (10), all purified liquid flows to the storage cavity (16) for purified liquid of the container (5).

When purified liquid starts flowing to the storage cavity (16) for purified liquid of the container (5) via the purified liquid distribution section (10), source liquid keeps concurrently flowing to the displacement cavity (15) for source liquid via the recirculation line (12) (FIG. 2) or via the source liquid feed line (18) (FIG. 1). As the displacement cavity (15) and the storage cavity (16) of the container (5) are divided by means (17) that is capable of conveying pressure, with the purified liquid which is under a pressure produced by the pressure increasing means (6) and exceeding the pressure of source liquid in the displacement cavity (15) for source liquid, filling the storage cavity (16) for purified liquid, the latter begins to expand, gradually displacing the source liquid from the displacement cavity (15) for source liquid, wherein the displaced source liquid receives a pressure that exceeds the pressure of the source liquid flowing to the displacement cavity (15) for source liquid. Thus, the direction of source liquid flow changes, and the source liquid displaced from the displacement cavity (15) for source liquid of the container (5) flows via the recirculation line (12) of the source liquid distribution section (11) to the source liquid feed section (9), and flows via the pressure increasing means (6) to the liquid purification means (7). (FIG. 2). In case the source liquid distribution section (9) has a two-line arrangement, the source liquid displaced from the displacement cavity (15) for source liquid of the container (5) flows to the source liquid feed section (9) via a source liquid displacement line (19) (FIG. 1). Thus, at least a portion of source liquid from the displacement cavity (15) for source liquid of the container (5) returns into the liquid purification process (FIGS. 1, 2, 6).

Figure 4:
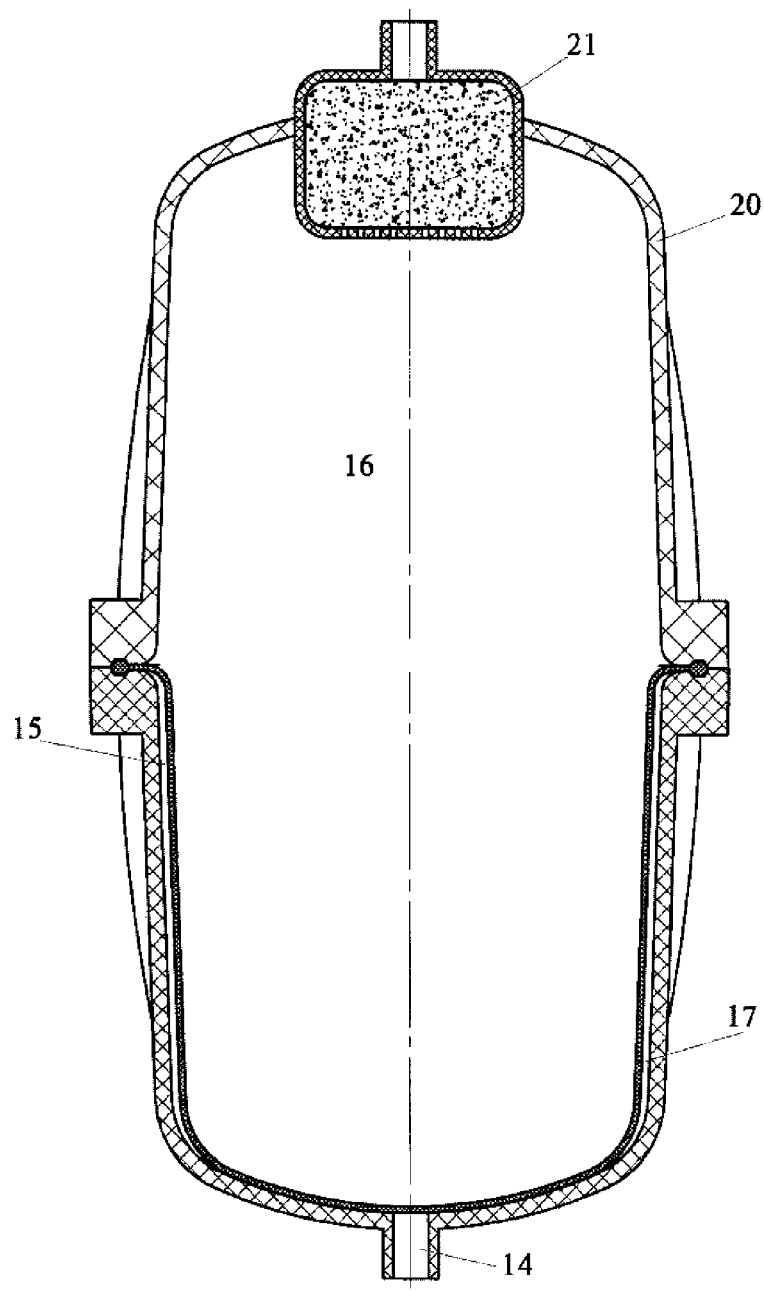
FIG. 4 shows an embodiment of the liquid-liquid type container consisting of a body and a means that defines the storage cavity for purified liquid and the displacement cavity, disposed within the body and made in the form of a membrane of a polymer material, and further including a mineralization means.

By virtue of a mineralizer (21) mounted in the storage cavity (16) for purified liquid of the container (5), when purified liquid flows therein, the purified liquid passes three stages of mineralization (upon entering the cavity (16), when the purified liquid is fed to the consumer, and in a state without motion when the purified liquid stays in the cavity (16) until fed to the consumer), thus being enriched with mineral substances that are necessary for the consumer (FIGS. 3, 4).

When purified liquid is fed from the storage cavity (16) for purified liquid of the container (5) to the purified liquid feed line, the volume of the storage cavity (16) for purified liquid gradually decreases until the cavity (16) reaches its minimum volume defined by the shape of the body (20) and/or the shape of the mineralization means (21). Furthermore, aside from the enrichment of purified liquid with mineral substances, the mineralization means (21) prevents portions of polymer membrane from sticking together and forming cavities filled with purified liquid that are separated from the storage cavity (16) for purified liquid, which would lead to holding up the purified liquid (FIGS. 3, 4).

For the improvement of performance properties, the liquid purification system may be provided with an automatic liquid filtration process stopping means (32) (FIG. 6). The automatic liquid filtration process stopping means may be embodied e.g. as a high-pressure control switch (32). When purified liquid pressure in the storage cavity (16) for purified liquid of the container (5) reaches its limit, the pressure increasing means (6) is switched off by means of the automatic liquid filtration process stopping means (32) and the liquid purification process is stopped. Upon completion of the liquid purification process, the purified liquid in the storage cavity (16) for purified liquid is under a pressure, the value of which is greater than or equal to the value of source liquid pressure in the displacement cavity (15) for purified liquid of the container (5), and thus purified liquid feed to the consumer directly from the cavity for purified liquid is enabled without any additional auxiliary means for increasing the rate of purified liquid flow.

In case the liquid feed means to the consumer (not shown in the figures) is in a position of "liquid feed to the consumer is closed", purified liquid completely fills the storage cavity (16) for purified liquid, thus displacing all source liquid from the displacement cavity (15) for source liquid. When the purified liquid feed means to the consumer (not shown in the figures) is opened, purified liquid pressure in the container (5) drops, the storage cavity (16) for purified liquid shrinks, and source liquid again starts flowing to the displacement cavity (15) for source liquid.

In the process of liquid purification, drainage liquid is drained after the liquid purification means (7) via the drainage liquid line (8) (FIGS. 1, 2, 5). For the adjustment of the purified liquid and drainage liquid proportion, at least one shutoff valve (23), which may be completely opened, partly opened or completely closed, is mounted in the drainage liquid line (8) (FIGS. 5a,b). The smaller the rate of drainage liquid flow, the greater the amount of drainage liquid would result from a unit volume of source liquid.

In order to reduce liquid loss in the process of purification, a drainage liquid recirculation line (24) may be coupled to the drainage line (8) (FIGS. 5a, 5b). Furthermore, at least one shutoff valve (23), which may be completely opened, partly opened or completely closed, may also be mounted in the drainage liquid line (8). When the shutoff valve (23) is completely opened, drainage liquid flows to the recirculation line (24) and returns to the source liquid feed section (9) before the inlet of the pressure increasing means (6), where it is mixed with the source liquid (FIGS. 5a, 5b). In another embodiment, the displacement cavity (15) for source liquid of the container (5) may be connected to the recirculation line (24), and the drainage liquid may be mixed with the source liquid in the displacement cavity (15) for source liquid of the container (5) (not shown in the figures). When the valve (23) is partly opened, a portion of drainage liquid is drained, and another portion is recirculated. When the valve (23) is completely opened, all drainage liquid is drained. Besides the valve (23), the drainage liquid line may be provided with a flow restrictor (not shown in the figures) to reduce the rate of drainage liquid flow. The flow restrictor (not shown in the figures) may also be mounted in the drainage liquid recirculation line (24). Drainage liquid concentration level adjustment may be further implemented by means of a liquid salt content sensor (not shown in the figures).

Furthermore, the liquid purification means (26), e.g. a hollow-fiber module (26) (FIGS. 5a, 5b), may be mounted in the drainage liquid recirculation line (24). When drainage liquid enters the recirculation line (24), it passes through the hollow-fiber module (26), thus reducing the concentration of impurities in the drainage water. For back-flushing the hollow-fiber module (26), the shutoff valve (22) is closed, and source liquid flows to the module (26) and is drained after the flushing (FIG. 5a), or shutoff valves (22) and (25) are closed, and source liquid flows to the hollow-fiber module (26) via the pressure increasing means (6) and is drained via the drainage line (8) (FIG. 5b).

Thus, liquid purification process may take place continuously and purified liquid may be fed to the consumer at any stage of the liquid purification process until the liquid purification system is forced to stop. Moreover, in case of stopping the liquid purification by means of forced shutdown of the liquid purification system, the purified liquid feed process may be resumed at any time when the purified liquid feed means is opened (not shown in the figures). After the liquid purification system is switched off the purified liquid pressure in the storage cavity (16) for purified liquid of the container (5) is reduced but remains higher than atmospheric pressure by virtue of the source liquid that keeps flowing to the displacement cavity (15) for source liquid even after the system is switched off. By virtue of this, unlike the closest prior art, when the purified liquid feed means is opened, the purified liquid immediately flows to the consumer.

A preferred embodiment of the invention was presented in this specification. It may be modified within the scope of the claims, which enables its broad application.

What is claimed is:

1. A liquid purification system comprising:
   a source liquid supply,
   a purified liquid feed line to a consumer,
   a liquid purification unit in fluid communication with the source liquid supply and the purified liquid feed line, the liquid purification unit comprising:
      a liquid-liquid type container comprising a body and a means that defines a storage cavity for purified liquid and a displacement cavity to receive source liquid from the source liquid supply, said means disposed within the body,
      at least one liquid purification means,
      a drainage line in fluid communication with the liquid purification means, and
      a liquid flow control system including a source liquid feed section, a purified liquid feed section, and a source liquid distribution section,
   wherein in the liquid purification unit, the liquid flow control system is configured to maintain liquid pressure in the displacement cavity of the container higher than atmospheric pressure,
   wherein the source liquid feed section comprises an inlet in fluid communication with the source liquid distribution section and an outlet in fluid communication with the liquid purification means,
   wherein the purified liquid feed section comprises an inlet in fluid communication with the liquid purification means, a first outlet in fluid communication with the purified liquid feed line, and a second outlet in fluid communication with the storage cavity, and
   wherein the source liquid distribution section is configured to pass source liquid displaced from the displacement cavity to the source liquid feed section and to distribute and redirect flows of source liquid and purified liquid without using a hydro automatic unit, and
   wherein the source liquid distribution section has:
      a contra-flow liquid movement arrangement and includes a source liquid recirculation line connected on one end with the displacement cavity for source liquid of the container and on an other end with the source liquid supply and the source liquid feed section;
   wherein the source liquid feed section of the liquid flow control system, having the source liquid feed section inlet connected to the source liquid distribution section and the source liquid feed section outlet connected to the liquid purification unit, further comprises a pressure increasing means that produces pressure which is conveyed via the liquid purification unit and the purified liquid feed section to the storage cavity for purified liquid of the container, and exceeds pressure maintained in the displacement cavity for source liquid of the container.

2. The liquid purification system of claim 1, wherein the means that defines the storage cavity for purified liquid and the displacement cavity, disposed within the body of the liquid-liquid type container, is made of a polymer material and adapted to reversibly change shape during liquid purification, substantially taking the body's shape.

3. The liquid purification system of claim 1, wherein the liquid-liquid type container further comprises a liquid mineralization unit disposed mostly within the storage cavity for purified liquid of the container and coupled to the outlet of the liquid purification unit and the purified liquid feed line to the consumer via the purified liquid feed section.

4. The liquid purification system of claim 1, further comprising a drainage liquid recirculation line having a drainage liquid recirculation line inlet connected to the liquid purification unit and a drainage liquid recirculation line outlet connected to the source liquid feed section of the liquid flow control system or to the displacement cavity for source liquid of the container.

5. The liquid purification system of claim 4, wherein the drainage liquid recirculation line further includes at least one liquid purification unit.

6. The liquid purification system of claim 5, wherein the drainage liquid recirculation line is adapted to perform flushing the liquid purification unit.

7. The liquid purification system of claim 6, wherein the drainage liquid recirculation line is further provided with at least one shutoff valve or electromagnetic valve.

8. The liquid purification system of claim 1, wherein the drainage line further comprises a source liquid concentration level adjustment means.

9. The liquid purification system of claim 8, wherein the source liquid concentration level adjustment means comprises at least one shutoff valve or restrictor.

10. The liquid purification system of claim 1, further comprising an automatic liquid purification process stopping means for stopping the liquid purification process when a predetermined amount of purified liquid in the storage cavity for purified liquid of the container is reached.

11. The liquid purification system of claim 10, wherein the automatic liquid purification process stopping means comprises a high-pressure control switch and/or a shutoff valve.

12. The liquid purification system of claim 1, further comprising at least one source liquid pressure reduction means.

13. The liquid purification system of claim 12, wherein the source liquid pressure reduction means is disposed at a source liquid supply output and/or in the source liquid distribution section, and/or in the source liquid feed section of the liquid flow control system.

* * * * *